G. C. MURPHY & J. J. BOLTON.
ADVERTISING POSTER.
APPLICATION FILED AUG. 24, 1910.
985,274.
Patented Feb. 28, 1911.
2 SHEETS—SHEET 1.
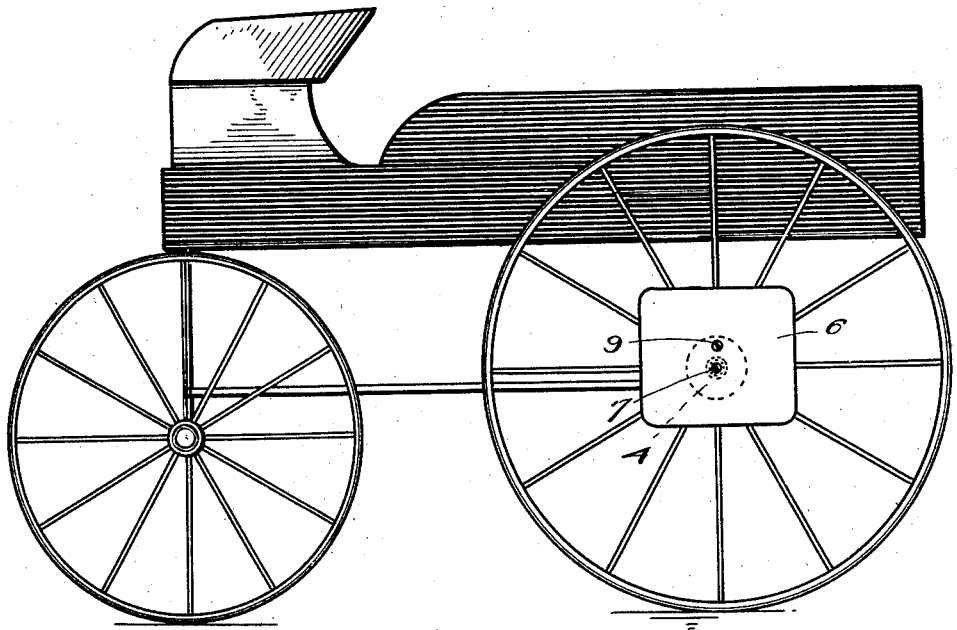
Fig. 1.
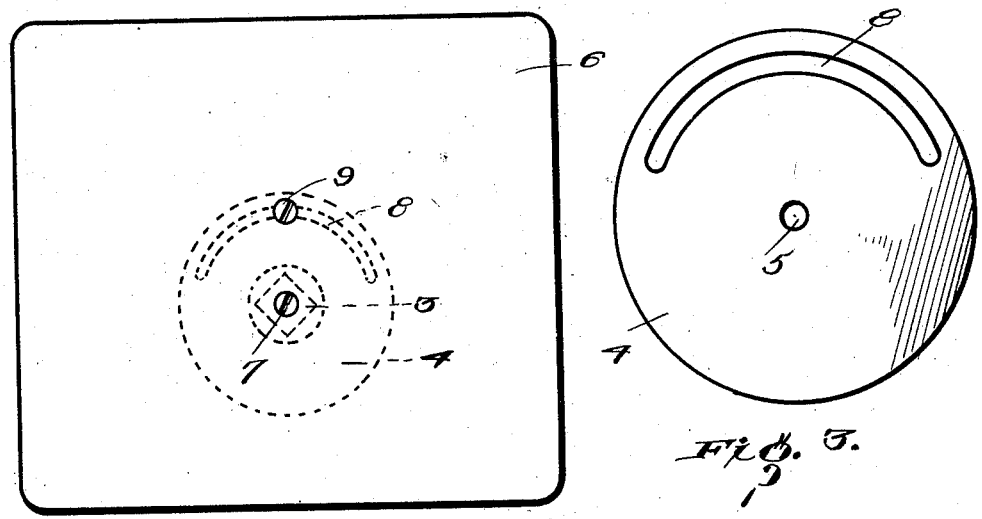
Fig. 2.
Fig. 3.
Witnesses
Inventors
George C. Murphy
James J. Bolton.
By their Attorney
THE NORRIS PETERS CO., WASHINGTON, D. C.

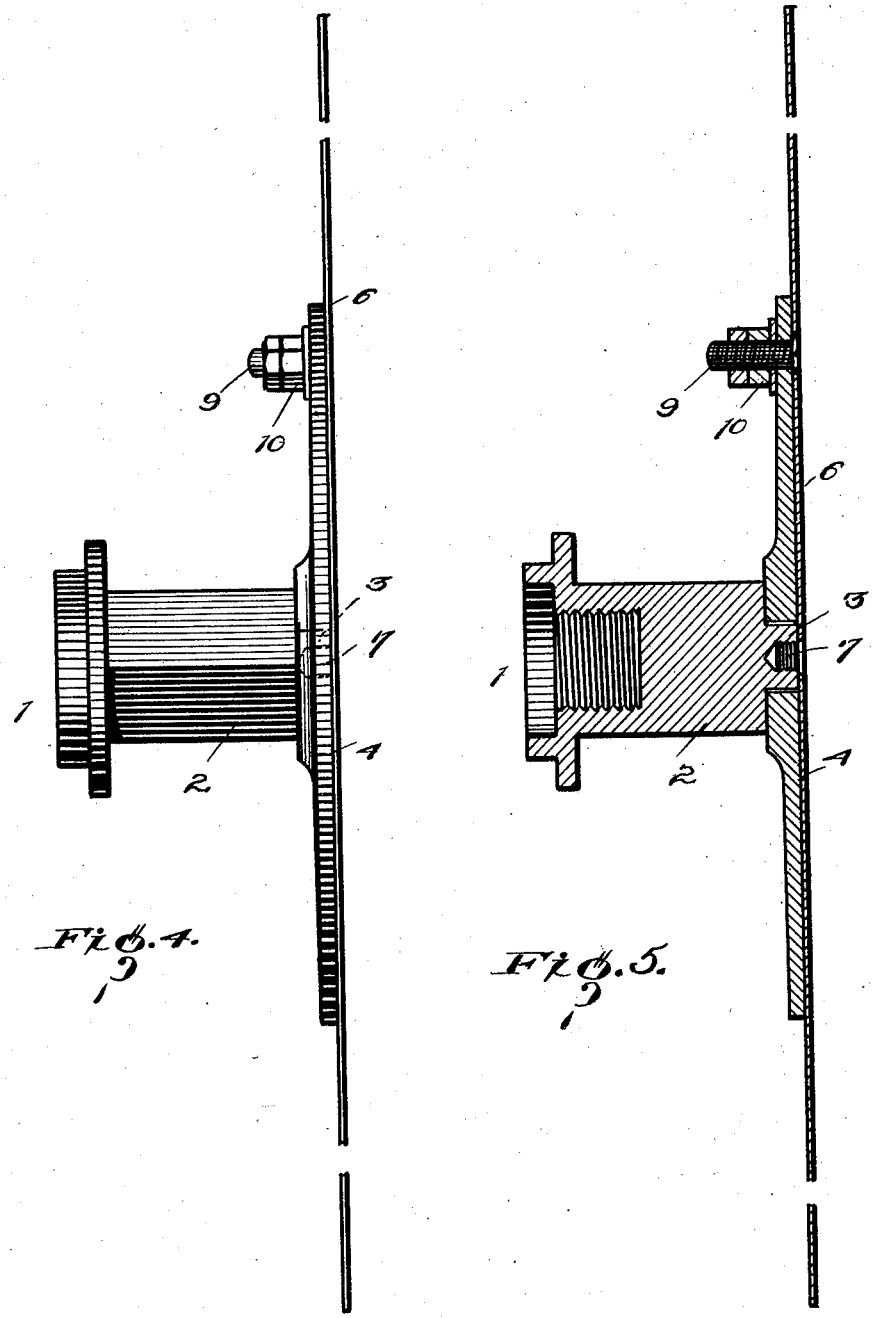

UNITED STATES PATENT OFFICE.

GEORGE C. MURPHY AND JAMES J. BOLTON, OF OWENSBORO, KENTUCKY.

ADVERTISING-POSTER.

985,274.  Specification of Letters Patent.  Patented Feb. 28, 1911.

Application filed August 24, 1910.  Serial No. 578,669.

*To all whom it may concern:*

Be it known that we, GEORGE C. MURPHY and JAMES J. BOLTON, citizens of the United States, residing at Owensboro, in the county of Daviess and State of Kentucky, have invented certain new and useful Improvements in Advertising-Posters, of which the following is a specification, reference being had therein to the accompanying drawing.

This invention relates to advertising posters adapted to be supported on the axle spindle of a vehicle and has for its object to provide an improved device of this kind which will be firmly held in place and which may be rigidly secured to and removed from its position on the axle nut.

With this and other objects in view, the invention consists of an improved advertising device and in details of construction thereof as hereinafter set forth and claimed.

Referring to the accompanying drawings:—Figure 1 shows a vehicle with an advertising device attached thereto in accordance with this invention. Fig. 2 is an enlarged face view of the advertising device. Fig. 3 is an enlarged detail view of a portion of the device for attaching the device to the vehicle. Fig. 4 is an enlarged detail view showing the axle nut of the vehicle and the advertising device secured thereto. Fig. 5 is a longitudinal section of the device shown in Fig. 4.

1 indicates the axle nut of the vehicle. The axle spindle is formed with a rectangular shank 2 having at one end a reduced portion 3 over which is secured a plate 4, having a central opening 5 in which the projection 3 is seated. To the plate 4 is secured the advertising device 6 which, as here shown, consists of a plate adapted to have any suitable advertisement thereon. The plate 6 is secured to the shank 2 by means of a screw 7 engaging the projection 3. In order that the plate may be adjusted to proper position when the nut is secured in place, suitable means is provided for adjusting the plate 6, as, for example, the curved slot 8 in the plate 4 parallel with its periphery, through which projects a screw or bolt 9 secured to the plate 6 and held in adjustable position by nut 10. It will be seen that by means of this construction advertisements may be readily attached to and detached from the vehicle axle spindle.

Having described our invention, we claim:—

An advertising device of the character described comprising a nut-member provided with a threaded socket formed in one end thereof adapted to fit on the end of an axle, a square shank-portion formed intermediate its ends for facilitating the tightening of said nut-member upon the end of an axle, said nut-member provided with a reduced projection at its outer end thereby constituting an abutment shoulder at the junction of said reduced portion, with said shank portion, a circular plate provided with a centrally arranged aperture fitting over said reduced portion, the inner face of said plate engaging said abutment shoulder, an advertising plate engaging the outer face of said circular plate, a screw passing through said advertising plate and engaging the threaded socket formed in the outer end of said reduced portion for clamping said advertising plate against the said circular plate and said circular plate against said shoulder, said circular plate provided with a curved slot, a screw carried by said advertising plate and working in said slot for allowing the adjustment of said advertising plate on said circular plate, and means working upon said screw for clamping said advertising plate in a set position.

In testimony whereof we hereunto affix our signatures in presence of two witnesses.

GEO. C. MURPHY.
JAMES J. BOLTON.

Witnesses:
E. W. Ross,
C. W. WELLS.

Copies of this patent may be obtained for five cents each, by addressing the "Commissioner of Patents, Washington, D. C."